United States Patent [19] Moore

[11] 3,944,999

[45] Mar. 16, 1976

[54] COLOUR DISPLAY APPARATUS

[75] Inventor: John Richard Moore, Knutsford, England

[73] Assignee: International Computers Limited, England

[22] Filed: Nov. 20, 1974

[21] Appl. No.: 525,654

[30] Foreign Application Priority Data

Dec. 20, 1973 United Kingdom ............... 59177/73

[52] U.S. Cl. ............................ 340/324 AD; 358/13

[51] Int. Cl.[2] ............................................ G06F 3/14

[58] Field of Search .......... 340/324 AD; 358/12, 13, 358/14

[56] References Cited

UNITED STATES PATENTS

| | | | |
|---|---|---|---|
| 3,603,962 | 9/1971 | Lechner | 340/324 AD |
| 3,624,634 | 11/1971 | Clark | 340/324 AD |
| 3,659,283 | 4/1972 | Ophir | 340/324 AD |
| 3,685,038 | 8/1972 | Flanagan | 340/324 AD |
| 3,720,780 | 3/1973 | Remy et al. | 358/13 |
| 3,771,155 | 11/1973 | Hayashi et al. | 340/324 AD |
| 3,854,130 | 12/1974 | Ligocki | 340/324 AD |

*Primary Examiner*—David L. Trafton
*Attorney, Agent, or Firm*—Misegades, Douglas & Levy

[57] ABSTRACT

A Colour Display Apparatus comprises a three-gun cathode ray tube modulated by an input video signal from a digital computer. The video signal contains digital colour codes in the portions of the signal which correspond to blank spaces in the display (e.g. spaces between rows of characters). These codes are stored in a circulating shift and are used to gate the video input to the appropriate combination of guns to produce the required colour for each symbol.

6 Claims, 2 Drawing Figures

FIG.1.

COLOUR DISPLAY APPARATUS

BACKGROUND OF THE INVENTION

This invention relates to colour display apparatus and is particularly, although not exclusively, concerned with display apparatus for displaying data generated by a digital computer.

One known device for producing a colour display is a colour cathode ray tube, e.g. a shadow-mask tube having three electron guns, one for each of the three colours red, green and blue. Conventionally, separate luminance and chrominance signals are used to carry brightness and colour information for the display device these signals being transmitted simultaneously in the form of phase-modulated carrier signals. However, this involves the use of complicated and expensive decoding circuits for converting the signals into suitable form for feeding to the electron guns. For displaying data from a computer, a simpler method has been proposed, in which the computer is arranged to generate three separate colour signals, representing the red, green and blue components of the display, these signals being fed directly to the three electron guns of the tube without decoding. However, this method has the disadvantage that it requires three separate wires for connecting the computer to the display device.

SUMMARY OF THE INVENTION

According to a first aspect of the present invention, there is provided a colour display apparatus wherein, in operation, an input video signal is modulated on to a raster pattern to produce a colour display containing a plurality of areas of information separated by spaces, the colour of said areas being determined by colour information contained in portions of the video signal corresponding to said spaces.

In a preferred form of the invention, each said area of information consists of a row of symbols, and said spaces are the spaces between adjacent rows of symbols. Preferably, the colour information comprises a plurality of digital codes, each code specifying the colour of a corresponding symbol in the immediately following row of symbols.

In a preferred embodiment of the invention, the display apparatus includes: sampling means for deriving said digital codes from each portion of the video signal corresponding to a space, a register for storing said codes, and means for reading the codes out of the register, one at a time, in synchronism with the receipt of the portion of the video signal corresponding to the following row of symbols.

The apparatus preferably includes a cathode ray tube having a plurality of electron guns each arranged to produce a different colour on the screen of the tube, and in this case, each digital code read out of the register is preferably used to gate the video signal to one or more of said guns so as to produce the colour represented by that code. The register is conveniently a cyclic shift register, arranged to circulate once during each line period of the raster pattern.

The invention also includes within its scope the combination of a computer and a display apparatus according to the first aspect of the invention.

BRIEF DESCRIPTION OF DRAWINGS

One display system in accordance with the invention will now be described, by way of example, with reference to the accompanying drawings of which

DESCRIPTION OF THE PREFERRED EMBODIMENT

Figure 1:
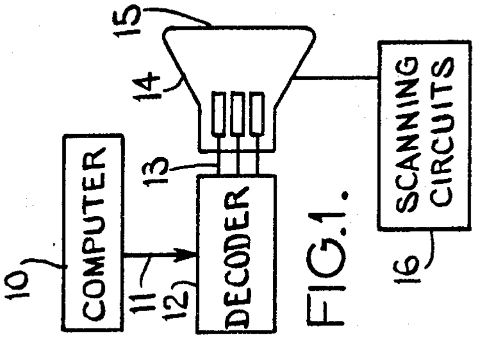
FIG. 1 is a schematic block diagram showing a computer system including a display apparatus.

Referring to FIG. 1, the computer system comprises a computer 10, which is arranged to produce an output video signal on a wire 11, this signal being applied as input to a colour decoder circuit 12. The decoder circuit 12 converts this signal into three separate output signals on three wires 13, which are respectively connected to the modulation inputs of the three electron guns of a shadow-mask cathode ray tube 14 so as to modulate the intensities of the colours red, green and blue respectively. The three electron beams produced in the tube 14 are scanned across the screen 15 of the tube in a conventional television-type raster pattern comprising a large number of horizontal lines (e.g. 625) under control of scanning circuits 16.

Since the computer 10, cathode ray tube 14 and scanning circuits 16 are all well-known items they will not be described in detail herein. However, the decoder circuit 12 will be described in detail below.

In operation of the system, the tube 14 is caused to display symbols (e.g. alphanumeric characters) under control of the computer 10. The characters are arranged in horizontal rows on the screen 15, each row containing, in the present example, 64 characters. Each of these rows is formed from a plurality of raster lines (typically seven lines) and is separated from the adjacent row of characters by a space, consisting of at least one blank raster line. As will be described, these blank raster lines are utilized for the transmission of digital codes specifying the colours of the characters in the display. Each of these digital codes consists of three serially transmitted binary digits (bits), one for each of the colours red, green and blue, a binary "1" signifying the presence and a binary "0" signifying the absence of the corresponding colour.

Thus, it can be seen that seven different colours can be specified by the seven possible three-bit codes (not counting the code 000 which signifies black) as shown in the following table.

| Code | Guns energised | Resulting Colour |
|---|---|---|
| 001 | Red only | Red |
| 010 | Green only | Green |
| 011 | Red and Green | Yellow |
| 100 | Blue only | Blue |
| 101 | Red and Blue | Purple |
| 110 | Green and Blue | Cyan |
| 111 | All three | White |

In the particular enbodiment described herein, the green/blue mixture is not, in fact, used since it is considered to be insufficiently distinct from green or blue and could cause confusion.

Figure 2:
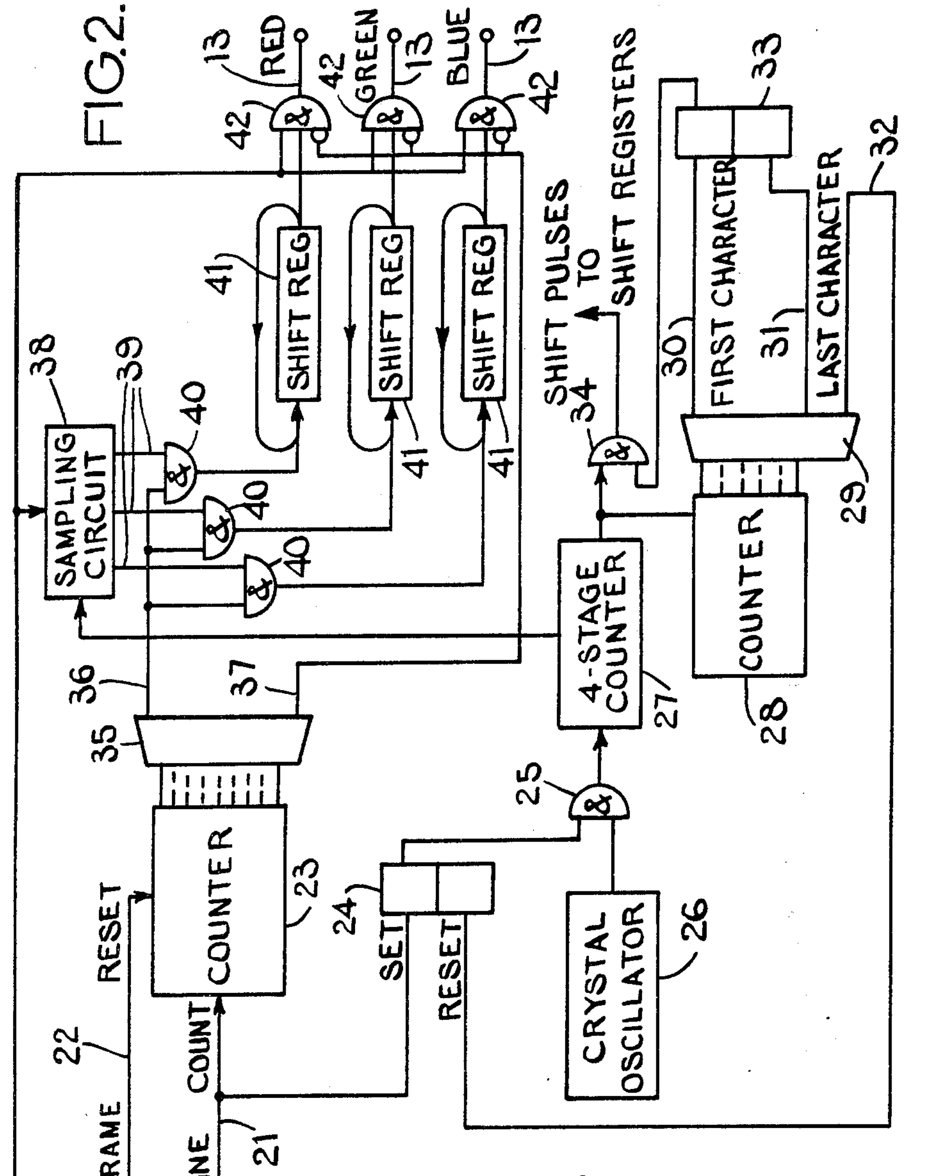
FIG. 2 is a more detailed block circuit diagram of a part of the display apparatus.

Referring now to FIG. 2, this shows the colour decoder circuit 12 in greater detail. In this circuit the video signal on wire 11 is fed to a conventional sync separating circuit 20, which produces a line sync pulse on a wire 21 to mark the beginning of each raster line, and a frame sync pulse on a wire 22 to mark the beginning of each frame of the raster.

The line sync pulses on wire 21 are applied to a binary counter 23, and cause the counter to be incremented by one at the beginning of each raster line, the counter being re-set to zero by the frame sync pulses on wire 22. Thus, at any given instant, the counter 23 contains a number which denotes which line of the raster is currently being scanned.

The line sync pulses on wire 21 are also applied to a bistable circuit 24, having SET and RESET, states so as to cause the bistable to be SET at the beginning of each raster line. When it is SET, the bistable produces an output signal which enables an AND gate 25, so as to permit clock pulses from a crystal oscillator 26 to pass to the input of a 4-bit binary counter 27, which acts to divide the frequency of the clock pulses by sixteen. The frequency of the oscillator is chosen to be 16 times the character rate of the system (the character rate being defined as the inverse of the time taken to scan the distance between the centres of adjacent characters along a raster line). Thus, it will be seen that the output of the counter 27, when bistable 24 is SET, consists of a series of pulses at the character rate of the system.

The output of the counter 27 is applied to a further binary counter 28, so as to increment the counter 28 by one in the space between each adjacent pair of characters. Thus, at any instant, the counter 28 contains a record of the number of characters which have been scanned at that instant in the current raster line. The output of the counter 28 is applied to a decoder circuit 29, which is arranged to detect those states of the counter 28 which correspond to the first and last characters in the raster line, and to the end of the raster line. Upon detection of these states, output signals are produced on wires 30, 31 and 32 respectively.

The "end of line" signal on 32 is used to RESET the bistable 24 so as to prevent any further clock pulses from being gated to the counter 27 through the AND gate 25, until the bistable 24 is SET again at the beginning of the next raster line.

The "first character" and "last character" signals on wires 30 and 31 are respectively used to SET and RESET a further bistable circuit 33. When SET, this bistable 33 enables an AND gate 34, so as to allow this gate to pass clock pulses from the counter 27. Thus it will be seen that, in each raster line, a sequence of 64 clock pulses is produced at the output of gate 34, each pulse occurring at a time position corresponding to the space between two adjacent characters. The purpose of these pulses will be described below.

The outputs of the stages of the raster line counter 23 are applied to a decoder circuit 35, which is arranged to detect those states of the counter 23 which correspond to the blank raster lines containing the digital codes. When such a blank raster line is detected, the decoder 35 produces two output signals on wires 36 and 37.

As mentioned above, the digital colour codes appear on the wire 11 in serial form. Each set of three bits, constituting a colour code, is sampled by means of a sampling circuit 38, upon receipt of sampling pulses from the counter 27, so as to produce a three-bit colour code in parallel on three output wires 39.

These three bits are fed, by way of three AND gates 40, which are enabled during the blank raster line 5 by means of the signal on wire 36 from the decoder 35, to a three-bit wide shift register 41, comprising three one-bit wide, 64-stage cyclic shift register components. The shift register 41 driven by means of the clock pulses from the AND gate 34, so that its contents are shifted forward, by one stage at each point of time corresponding to a space between adjacent characters. Thus, it will be seen that, during the blank raster line, 64 3-bit colour codes are successively written into respective stages of the register 41, so that, at the end of the blank line, the register 41 contains complete colour information regarding the following row of characters.

The video signal on wire 11 is also applied to three AND gates 42, the outputs of which are respectively fed by way of wires 13, to the three electron guns (red, green and blue) of the cathode ray tube 14. During the blank lines, these three gates 42 are all inhibited by means of the signal on wire 37 from the decoder 35, thus preventing the colour codes contained in that line from being visible on the screen. During scanning of the raster lines corresponding to a row of characters, this inhibiting signal is removed, and the gates 42 are then controlled by the outputs from the shift register 41, i.e. by the colour codes which were stored in the shift register during the preceding blank line. It will be seen that, as each character is scanned, the corresponding colour code is read out of the shift register in synchronism, thus controlling the colour of the displayed character in accordance with the stored colour code.

An important feature of the colour display apparatus described above by way of example is that it is compatible with monochrome display apparatus in the sense that the video signal on wire 11 may also be fed to a conventional monochrome tube to produce the same display (although, of course, in black and white only), without the need for any special equipment. Preferably, it is arranged that the colour information transmitted during the blank lines is of smaller amplitude than the intensity information, (e.g. half the amplitude of the intensity information) so that the colour information can be rendered invisible on the monochrome by turning up the contrast (video gain) and turning down the brightness so as to bring the colour information below black level.

I claim:

1. Colour display apparatus for displaying a plurality of rows of information separated by spaces which apparatus comprises: a display device scanned in a raster pattern, the said rows of information comprising a plurality of raster lines and the said spaces each comprising at least one raster line; means for modulating an input signal onto at least the portions of the raster pattern corresponding to the said rows of information; sampling means for deriving a sequence of digital colour codes from the input signal during each period the raster pattern scans one of the said spaces between the rows of information; register means for storing each of the said sequences of colour codes as it is derived; means for reading out the colour codes from the register means, one at a time, in synchronism with the receipt of the portion of the input signal corresponding to the following row of information; and means for controlling the colour of the display in response to the colour code currently being read out from the register means.

2. Apparatus according to claim 1 wherein said display device is a cathode ray tube having a plurality of electron guns, each producing a different colour, the apparatus including gating means for gating the video signal to a selection of the electron guns as determined by the digital code currently read out of the register means.

3. Apparatus according to claim 1 wherein said register means are cyclic shift register means arranged to circulate once during each line period of the raster.

4. Apparatus according to claim 1 including means for inhibiting the display during portions of the raster corresponding to said spaces, thereby preventing said colour codes being visible in those spaces.

5. Apparatus according to claim 1 wherein said sampling means are responsive to signals of a substantially smaller amplitude than the portions of the video signal corresponding to said rows.

6. The combination of a colour display apparatus in accordance with claim 1 and a digital computer for supplying said video signal to the display apparatus.

* * * * *